US011663113B2

(12) United States Patent
Hicks et al.

(10) Patent No.: US 11,663,113 B2
(45) Date of Patent: May 30, 2023

(54) REAL TIME FAULT LOCALIZATION USING COMBINATORIAL TEST DESIGN TECHNIQUES AND TEST CASE PRIORITY SELECTION

(71) Applicant: INTERNATIONAL BUSINESS MACHINES CORPORATION, Armonk, NY (US)

(72) Inventors: Andrew C. M. Hicks, Wappingers Falls, NY (US); Ryan Thomas Rawlins, New Paltz, NY (US); Dale E. Blue, Poughkeepsie, NY (US); Brian Mo, Rego Park, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 16/795,961

(22) Filed: Feb. 20, 2020

(65) Prior Publication Data
US 2021/0263837 A1    Aug. 26, 2021

(51) Int. Cl.
*G06F 11/00*      (2006.01)
*G06F 11/36*      (2006.01)

(52) U.S. Cl.
CPC ...... *G06F 11/3688* (2013.01); *G06F 11/3684* (2013.01)

(58) Field of Classification Search
CPC .................. G06F 11/3684; G06F 11/3688
See application file for complete search history.

(56) References Cited

U.S. PATENT DOCUMENTS 5,860,008 A    1/1999  Bradley
5,907,834 A    5/1999  Kephart
(Continued)

FOREIGN PATENT DOCUMENTS

WO    1999015966 A1    4/1999

OTHER PUBLICATIONS

Garcia-Molina, "Pair-Wise Entity Resolution: Overview and CHallenges (Invited Talk)," Proceedings of the 15th ACM International Conferene on Information and Knowledgement Management, Nov. 2006, 1 page.

(Continued)

*Primary Examiner* — Joshua P Lottich
(74) *Attorney, Agent, or Firm* — Cantor Colburn LLP; Teddi Maranzano

(57) ABSTRACT

A computer-implemented method for test case priority selection includes initiating execution of a set of test cases associated with a system under test. Further, the set of test cases are executed according to a first order of execution, and during the execution, at runtime a failing test case, from the set of test cases is determined. Further, at runtime, from the set of test cases, a subset of test cases that are not yet executed is identified. Further, at runtime, a priority value is assigned to each test case from the subset of test cases, the priority value based on a similarity of the test case with the failing test case. Further, at runtime, the set of test cases is reorganized to execute the subset of test cases in a second order of execution based on priority values that are assigned.

17 Claims, 6 Drawing Sheets

(56) References Cited

U.S. PATENT DOCUMENTS

| | | |
|---|---|---|
| 6,934,656 B2 | 8/2005 | Norman |
| 7,024,589 B2 | 4/2006 | Hartman |
| 7,519,997 B2 | 4/2009 | Shipp |
| 7,761,825 B2 | 7/2010 | Chadha |
| 8,132,056 B2 | 3/2012 | Thakkar |
| 8,151,248 B1 | 4/2012 | Butler et al. |
| 8,255,861 B2 | 8/2012 | Bhinge |
| 8,386,851 B2 | 2/2013 | Ur |
| 8,561,036 B1 | 10/2013 | Beans et al. |
| 8,904,536 B2 | 12/2014 | Breitenbacher |
| 8,972,785 B2 | 3/2015 | Kahne |
| 9,002,197 B2 | 4/2015 | Dahlfort |
| 9,003,222 B2 | 4/2015 | Bharmidipaty |
| 9,026,855 B2 | 5/2015 | Sharma |
| 9,043,761 B2 | 5/2015 | Artzi |
| 9,106,548 B2 | 8/2015 | Johnsson |
| 9,178,755 B2 | 11/2015 | Dahlfort |
| 9,305,165 B2 | 4/2016 | Snow |
| 9,317,401 B2 | 4/2016 | Bartley |
| 9,489,289 B2 | 11/2016 | Hu |
| 9,569,345 B2 | 2/2017 | Friedler |
| 9,733,907 B2 | 8/2017 | Goetz |
| 10,050,993 B2 | 8/2018 | Johri |
| 10,073,763 B1 | 9/2018 | Raman et al. |
| 10,083,191 B2 | 9/2018 | Barbas |
| 10,235,277 B2 | 3/2019 | Herzig et al. |
| 10,831,645 B1* | 11/2020 | McNeil ............... G06F 11/302 |
| 11,249,887 B2* | 2/2022 | Xu ........................ G06N 3/08 |
| 2003/0070119 A1* | 4/2003 | Dallin ............... G06F 11/3684 714/38.14 |
| 2006/0085132 A1 | 4/2006 | Sharma et al. |
| 2007/0094189 A1 | 4/2007 | Yamamoto et al. |
| 2008/0256404 A1 | 10/2008 | Funatsu |
| 2009/0265694 A1 | 10/2009 | Bakowski |
| 2009/0292956 A1 | 11/2009 | Rivera |
| 2011/0066490 A1 | 3/2011 | Bassin et al. |
| 2012/0089964 A1 | 4/2012 | Sawano |
| 2013/0041613 A1 | 2/2013 | Bhide et al. |
| 2013/0047140 A1 | 2/2013 | Shann et al. |
| 2013/0055014 A1 | 2/2013 | Kang |
| 2013/0061104 A1 | 3/2013 | Hartl |
| 2013/0013244 A1 | 10/2013 | Kristiansen |
| 2013/0318503 A1 | 11/2013 | Li et al. |
| 2014/0351793 A1 | 11/2014 | Bartley et al. |
| 2014/0355453 A1 | 12/2014 | Zhang |
| 2015/0081389 A1 | 3/2015 | Dereszynski et al. |
| 2016/0034375 A1 | 2/2016 | Sinha et al. |
| 2016/0170972 A1 | 6/2016 | Andrejko |
| 2016/0378647 A1* | 12/2016 | Maeoka ............ G06F 11/3688 717/124 |
| 2017/0068612 A1 | 3/2017 | Herzig et al. |
| 2017/0083432 A1 | 3/2017 | Dhulipala |
| 2017/0103013 A1 | 4/2017 | Grechanik |
| 2018/0101467 A1 | 4/2018 | Hisagi |
| 2018/0121332 A1 | 5/2018 | Andrejko |
| 2018/0189168 A1 | 7/2018 | Dwarakanath et al. |
| 2018/0267102 A1 | 9/2018 | Douskey |
| 2018/0276108 A1 | 9/2018 | Park |
| 2018/0307583 A1* | 10/2018 | Yang ..................... G06F 11/368 |
| 2018/0351788 A1 | 12/2018 | Tammana |
| 2019/0018753 A1 | 1/2019 | Saha |
| 2019/0034323 A1 | 1/2019 | M et al. |
| 2019/0065182 A1* | 2/2019 | Hsiung ..................... G06F 8/77 |
| 2019/0079853 A1 | 3/2019 | Makkar |
| 2019/0087312 A1 | 3/2019 | Akbulut |
| 2019/0155722 A1 | 5/2019 | Gupta et al. |
| 2019/0196950 A1 | 6/2019 | Ranganathan et al. |
| 2019/0332523 A1* | 10/2019 | Gefen ................ G06F 11/3688 |
| 2019/0340113 A1 | 11/2019 | Earanti et al. |
| 2020/0285570 A1* | 9/2020 | Knaack .............. G06F 11/3684 |
| 2020/0349062 A1 | 11/2020 | Coleman et al. |
| 2021/0042570 A1 | 2/2021 | Iskandar et al. |
| 2021/0064515 A1* | 3/2021 | Xu ..................... G06F 11/3684 |
| 2021/0263842 A1* | 8/2021 | Sekhar ............... G06F 11/3688 |
| 2022/0334952 A1* | 10/2022 | Jebbar ................ G06F 11/3684 |

OTHER PUBLICATIONS

Zheng et al., "Locating Minimal Fault Interaction in Combinatorial Testing," Advances in Software Engineering, vol. 2016, Article ID 2409521, pp. 1-10.

Zhuang et al., "Representation Learing with Pair-wise Constraints for Collaborative Ranking," Proceedings of the Tenth ACM International Conference on Web Search and Data Mining, Feb. 2017, pp. 567-575.

Balakrishnan et al., "WYSINWYX: What you see is not what you execute," ACM Transactions on Programming Languages and Systems, vol. 32, No. 6, Article 23, Aug. 2010. 84 pages.

Blue et al., "Interaction-Based Test-Suite Minimization", Proceedings of the 35th International Conference on Software Engineering (ICSE), May 2013. pp. 182-191.

Christodorescu et al., "Static analysis of executables to detect malicious patterns," Proceedings of the 12th USENIX Security Symposium (Security'03), Aug. 4-8, 2003, pp. 169-186.

Gong et al., "JITProf: Pinpointing JIT-unfriendly JavaScript Code," Proceedings of the 2015 10th Joint Meeting on Foundations of Software Engineering (ESEC/FSE 2015). ACM, New York, NY, USA, pp. 357-368.

Herzig et al.; "Empirically Detecting False Test Alarms Using Association Rules", 2015 IEEE/ACM 37th IEEE International Conference on Software Engineering, May 2015. 10 pages.

Hicks et al., "Assignment of Test Case Priorities Based on Combinatorial Test Design Model Analysis ," U.S. Appl. No. 16/795,963, filed Feb. 20, 2020.

Hicks et al., "Identifying False Positives in Test Case Failures Using Combinatorics," U.S. Appl. No. 16/795,966, filed Feb. 20, 2020.

Mo et al., "Machine Code Analysis for Identifying Software Defects," U.S. Appl. No. 16/795,969, filed Feb. 20, 2020.

Itai Segall, "Combinatorial Test Design," IBM Haifa Research Labs, 2012. 49 pages.

Laghari et al., "Fine-Tuning Spectrum Based Fault Localisation with Frequent Method Item Sets," 31st IEEE/ACM International Conference on Automated Software Engineering (ASE 2016), DOI: 10.1145/2970276.2970308. Sep. 2016. pp. 274-285.

List of IBM Patents or Patent Applications Treated as Related; Date Filed: Mar. 10, 2020, 2 pages.

Noor et al.; "A Similarity-Based Approach For Test Case Prioritization Using Historical Failure Data", 2015 IEEE 26th International Symposium on Software Reliability Engineering (ISSRE), Nov. 2015. 11 pages.

Pearson et al., "Evaluating & improving fault localization techniques," 2017 IEEE/ACM 39th International Conference an Software Engineering (Icse), Doi: 10.1109/ICSE.2017.62. Feb. 2017.27 pages.

Rahman et al.; "Prioritizing Dissimilar Test Cases In Regression Testing Using Historical Failure Data", International Journal of Computer Applications: vol. 180, No. 14, Jan. 2018. 8 pages.

Roongruangsuwan et al., "Test Case Prioritization Techniques", Journal of Theoretical and Applied Information Technology, vol. 8, No. 2. pp. 45-60. Aug. 2010.

Segall et al., "Interactive Refinement of Combinatorial Test Plans," Proceedings of the 34th International Conference an Software Engineering (ICSE), Jun. 2012 pp. 1371-1374.

Tzoref-Brill et al., "Visualization Of Combinatorial Models And Test Plans", Proceedings of the 31st IEEE/ACM International Conference on Automated Software Engineering, Sep. 2016. pp. 144-154.

Vangala et al.; "Test case Comparison And Clustering Using Program Profiles And Static Execution", Proceedings ol the 7th joint meeting of the European Software Engineering Conference and the Acm Sigsoe 1 International Symposium on Foundations of Software Engineering, Aug. 24-28, 2009. 2 Pages.

Zheng et al.; "Locating Minimal Fault Interaction In Combinatorial Testing", Hindawi Publishing Corporation, vol. 2016, Article ID 2409521, pp. 1-10, Apr. 19, 2016.

Gonzalez et al., "A Large-Scale Study on the Usage of Testing Patterns that Address Maintainability Attributes," arXiv: 1704.08412v1 [cs.SE] Apr. 27, 2017; 11 pages.

(56) References Cited

OTHER PUBLICATIONS

Rosenblum et al., "Predicting the Cost-Effectiveness of Regression Testing Strategies," Proceedings of the 4th ACM Symposium on Foundations of Software Engineering, 1996, pp. 118-126.

* cited by examiner ific features and benefits are realized through the techniques of the present invention. Embodi-
REAL TIME FAULT LOCALIZATION USING COMBINATORIAL TEST DESIGN TECHNIQUES AND TEST CASE PRIORITY SELECTION

BACKGROUND

The present invention relates generally to product testing, and more particularly, to priority selection of test cases from a regression bucket using real time fault localization.

Product development and testing environments may implement a set of processes and programming tools to investigate a product. Typically, users of system development, testing and production environments (e.g., software developers, hardware developers, etc.) may use program logs, crash reports, and debuggers to investigate the quality of a product such as a software program, a hardware component, etc. Testing a product during a development cycle may be challenging. The larger the product, the more source code and components to be tested, and the more challenging the testing may become. A failure may occur during testing due any number of things such as source code changes, hardware design change, requirement changes, and environment changes, among other factors.

SUMMARY

According to one or more embodiments of the present invention, a computer-implemented method for test case priority selection includes initiating execution of a set of test cases associated with a system under test. Further, the set of test cases are executed according to a first order of execution, and during the execution, at runtime a failing test case, from the set of test cases is determined. Further, at runtime, from the set of test cases, a subset of test cases that are not yet executed is identified. Further, at runtime, a priority value is assigned to each test case from the subset of test cases, the priority value based on a similarity of the test case with the failing test case. Further, at runtime, the set of test cases is reorganized to execute the subset of test cases in a second order of execution based on priority values that are assigned.

According to one or more embodiments of the present invention, a system for machine code analysis includes at least one processor, and at least one memory storing computer-executable instructions. The at least one processor accesses the at least one memory to perform a method for test case priority selection. The method includes initiating execution of a set of test cases associated with a system under test. Further, the set of test cases are executed according to a first order of execution, and during the execution, at runtime a failing test case, from the set of test cases is determined. Further, at runtime, from the set of test cases, a subset of test cases that are not yet executed is identified. Further, at runtime, a priority value is assigned to each test case from the subset of test cases, the priority value based on a similarity of the test case with the failing test case. Further, at runtime, the set of test cases is reorganized to execute the subset of test cases in a second order of execution based on priority values that are assigned.

According to one or more embodiments of the present invention, a computer program product includes a storage medium readable by one or more processing circuits. The storage medium stores instructions executable by the one or more processing circuits to cause a method to be performed for test case priority selection. The method includes initiating execution of a set of test cases associated with a system under test. Further, the set of test cases are executed according to a first order of execution, and during the execution, at runtime a failing test case, from the set of test cases is determined. Further, at runtime, from the set of test cases, a subset of test cases that are not yet executed is identified. Further, at runtime, a priority value is assigned to each test case from the subset of test cases, the priority value based on a similarity of the test case with the failing test case. Further, at runtime, the set of test cases is reorganized to execute the subset of test cases in a second order of execution based on priority values that are assigned.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Example embodiments of the present invention relate to, among other things, devices, systems, methods, computer-readable media, techniques, and methodologies for performing fault detection and localization using Combinatorial Test Design (CTD) techniques, generating a regression bucket of test cases that expose the detected fault, and dynamic selection of an order of execution of test cases within the regression bucket. In example embodiments, the detected and localized fault occurs in a System Under Test (SUT). The SUT may be a hardware system, a software system, or a combination thereof.

Figure 1:
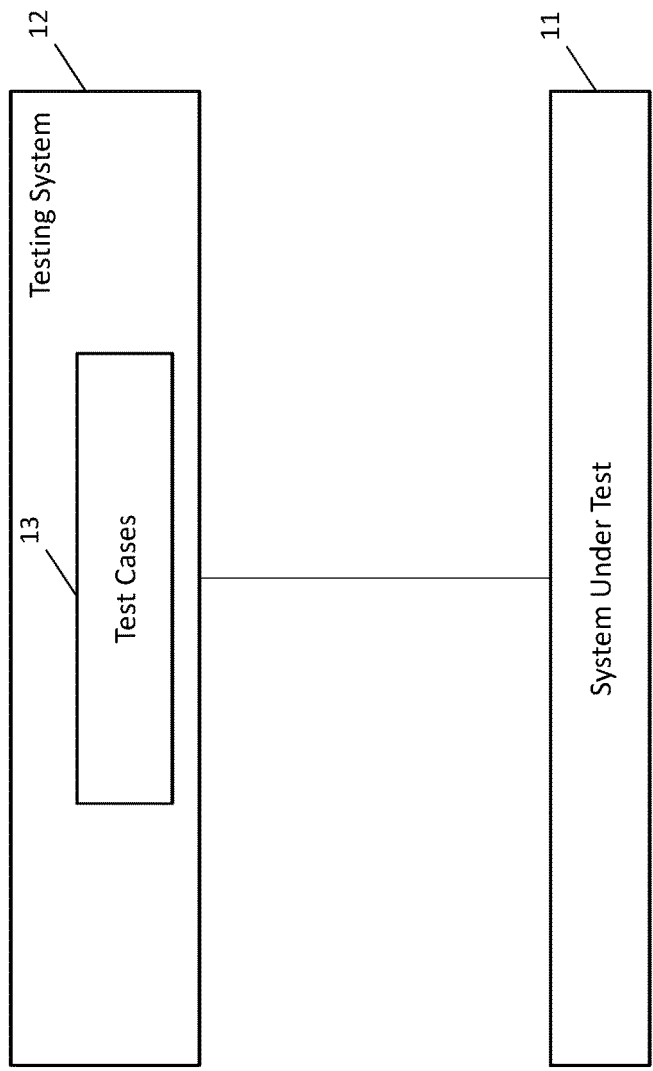
FIG. 1 is a schematic block diagram illustrating testing of a system under test in accordance with one or more example embodiments of the invention.

FIG. 1 illustrates a block diagram depicting a system for detecting defects in a system under test according to one or more embodiments of the present invention. The depicted system 10 includes a testing system 12 that tests a SUT 11. The SUT 11 includes hardware, software, and/or a combination thereof. The testing system 12 causes one or more test cases 13 to be executed by the SUT 11. The testing system 12 provides various inputs to the SUT 11 to execute the tests cases so as to exercise various parts of the SUT 11 in an attempt to detect a defect in the operation of the SUT 11.

In example embodiments of the present invention, inputs to the SUT 11 are modeled as a collection of attribute-value pairs. More specifically, inputs to the SUT 11 can be modeled as a collection of attributes, each of which can take on one or more corresponding attribute values. In example embodiments, the entire Cartesian product space that contains all possible combinations of attribute-value pairs can be reduced to a smaller set of test vectors that provides complete n-wise coverage of the entire test space. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of possible combinations of attribute-value pairs would be 4*3*3*2=72. In this illustrative example, the entire Cartesian product space would include 72 different combinations of attribute-value pairs. As previously noted, these 72 different combinations of attribute-value pairs can be reduced to a smaller set of combinations that provide complete n-wise coverage of the Cartesian product space. For instance, referring to the example introduced above, if complete pairwise coverage is sought, then the 72 different combinations can be reduced to 12 distinct combinations that together include every possible pairwise interaction of attribute values. The reduced number of combinations required to provide n-wise coverage may increase logarithmically as n increases.

In example embodiments, the entire Cartesian product space including all combinations of attribute-value pairs is reduced to a smaller set of CTD test vectors that provides complete n-wise coverage for a desired n. In complex hardware or software systems, the total number of attributes and corresponding candidate attribute values may be quite large, in which case, the total number of possible combinations of attribute values making up the entire Cartesian product space may be astronomically large, making it practically infeasible to test all possible combinations. Reduction of the Cartesian product space down to a substantially smaller number of CTD test vectors that still provide complete n-wise coverage allows for any n-wise (or m-wise where m<n) fault to be detected without having to directly test every possible combination in the test space.

In example embodiments of the present invention, a binary decision diagram or the like may be used to perform the reduction and identify the reduced set of CTD vectors that provides complete n-wise coverage. In example embodiments, each CTD test vector that is generated includes a unique combination of attribute values, and the set of CTD test vectors together include every possible n-wise interaction of attribute values. In particular, each CTD vector may have a dimension corresponding to the number of attributes that are modeled, where each element of the CTD vector is a respective attribute value for a corresponding attribute. The set of CTD vectors that is generated, however, may not be unique. That is, there may be multiple different sets of CTD vectors, each of which provides complete n-wise coverage. In example embodiments of the present invention, the CTD vectors may be chosen at random while still ensuring complete n-wise coverage. In other example embodiments of the present invention, the initial set of CTD vectors may be chosen with specific criteria in mind such as, for example, to increase or decrease the representation of particular attribute values within the set of CTD vectors.

In example embodiments of the present invention, once the initial set of CTD test vectors are generated, they are used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector.

In example embodiments of the present invention, the test cases are then executed. In example embodiments, execution of each test case results in either a successful execution result, indicating that the combination of attribute values associated with the test case does not contain an n-wise (or m-wise where m<n) error, or a failure execution result, indicating that the combination of attribute values associated with the test case do contain an n-wise (or m-wise where m<n) error.

In example embodiments of the present invention, a particular failing test case is selected and inverse combinatorics is applied to the failing test case to produce a new set of test cases 13 capable of detecting a cause of the failure, typically a defect in the SUT 11. In example embodiments of the present invention, application of inverse combinatorics to the selected failing test case includes generating a new test case for each respective attribute that was used by the test case. Accordingly, the maximum number of new test cases generated may be equal to the number of attributes. In example embodiments of the present invention, in each new test case, the attribute value of a corresponding attribute in the selected failing test case is changed to an attribute value for that attribute that is not present in any failing test case and the respective attribute value for each other attribute is unchanged from that which is present in the selected failing test case.

The new test case(s) that yield a successful execution result may then be assessed to detect and localize the n-wise (or m-wise where m<n) error. In particular, the specific attribute-value pairs that cause the error may be identified based on those new test cases that successfully execute. A set of test cases for fault localization may then be generated based on the error-producing combination of attribute-value pairs. More specifically, every possible combination of attribute values that include the attribute values determined to cause the error may be determined and the set of fault localization test cases that includes corresponding test cases for testing these combinations can be outputted for use by a manual tester, for example. In particular, in example embodiments, all test cases contained in the set of fault localization test cases will fail when executed until the defect is identified and repaired, after which all the test cases in that set should pass (i.e., produce a successful execution result).

In example embodiments of the present invention, while executing multiple test cases against the SUT 11, test cases that are created to verify similar parameters and exercising a particular execution path of the SUT 11, for example, a code path, may often fail at different points in time. However, a defect that causes a test case to fail may be widespread. For example, such a defect may cause several, or even all tests in the regression bucket to fail. That is, in other words, several tests from the regression bucket may fail for the same reason. For example, a storage outage may cause storage account creations to fail, which can result in similar failure logs, which can be grouped into one large bucket of failures.

In such a scenario, the execution time of all the test cases results in detection of a single defect. It should be noted that in larger SUT 11, such as enterprise systems, such execution times can be in the order of multiple days, and even weeks. Hence, spending the time and other resources (e.g., computing resources, electricity, personnel etc.) for executing the test cases in the regression bucket to only detect a single defect is inefficient, and one of the technical challenges faced by the testing system 12. One or more embodiments of the present invention address such technical challenges and improve the efficiency of the testing system 12. Early detection is useful for fast mitigation and save engineering investigation time.

To address such technical challenges, in one or more embodiments of the present invention the order of execution of the tests cases is revised at runtime to optimize the time of execution. In example embodiments of the present invention, by optimizing the order in which test cases are run, regression bucket execution times can be drastically reduced to yield faster completion times. That is, in example embodiments of the present invention, particular combinations of test cases within the regression bucket may be executed first to provide desired coverage. In this manner, it can be ensured that regression testing is optimized so as to be performed faster and/or with increased accuracy. Further, in example embodiments, when a selected test case corresponding to an initial CTD vector fails, a set of similar test cases designed to detect and localize an n-wise error. This group of test cases can be performed first. In this manner, it can be ensured that the expansion provides as much coverage of the test space in the neighborhood around the failing test case as soon as possible. The test cases included in the regression bucket may be selected from the reduced Cartesian space from which the initial set of CTD vectors are selected, in which case, the prioritized test cases from the regression bucket would include only those combinations of attribute values that include the subset of attribute values causing the error.

One or more embodiments of the present invention relate to, among other things, devices, systems, methods, computer-readable media, techniques, and methodologies for testing a product for detecting defects in the product. One or more embodiments of the present invention improve such testing techniques. Example embodiments of the present invention include various technical features that yield technical effects that provide various improvements to computer technology. For instance, example embodiments of the present invention include the technical feature of generating a regression bucket of test cases that tests every possible combination of attribute values that includes the particular subset of attribute values causing the n-wise fault. Such a regression bucket includes only test cases that would all fail prior to correction of the fault and that would all pass after correction of the fault. The automated generation of a regression bucket of failing test cases in accordance with example embodiments of the invention provides an improvement to computer technology by providing a tester or automated testing algorithm with a set of test cases—each of which is ensured to fail—such that the tester or automated testing algorithm can use the regression bucket of test cases to verify that a fault has been corrected when all test cases ultimately pass after debugging is performed. Example embodiments of the present invention also include the technical feature of inverse combinatorics to select a set of test cases based on a failing test case. This allows for an n-wise or lesser order fault to be detected and localized within a single iteration of the selection process. Accordingly, embodiments of the present invention provide an improvement to debugging and fault detection computer technology because it automates the prioritization of test cases around a selected failing test case in a manner that is specifically designed to facilitate detection and localization of a fault. Thus, the automated priority selection of test cases in a regression bucket in accordance with example embodiments of the invention is capable of exposing a fault more efficiently and using a fundamentally different methodology than manual test case generation.

Figure 2:
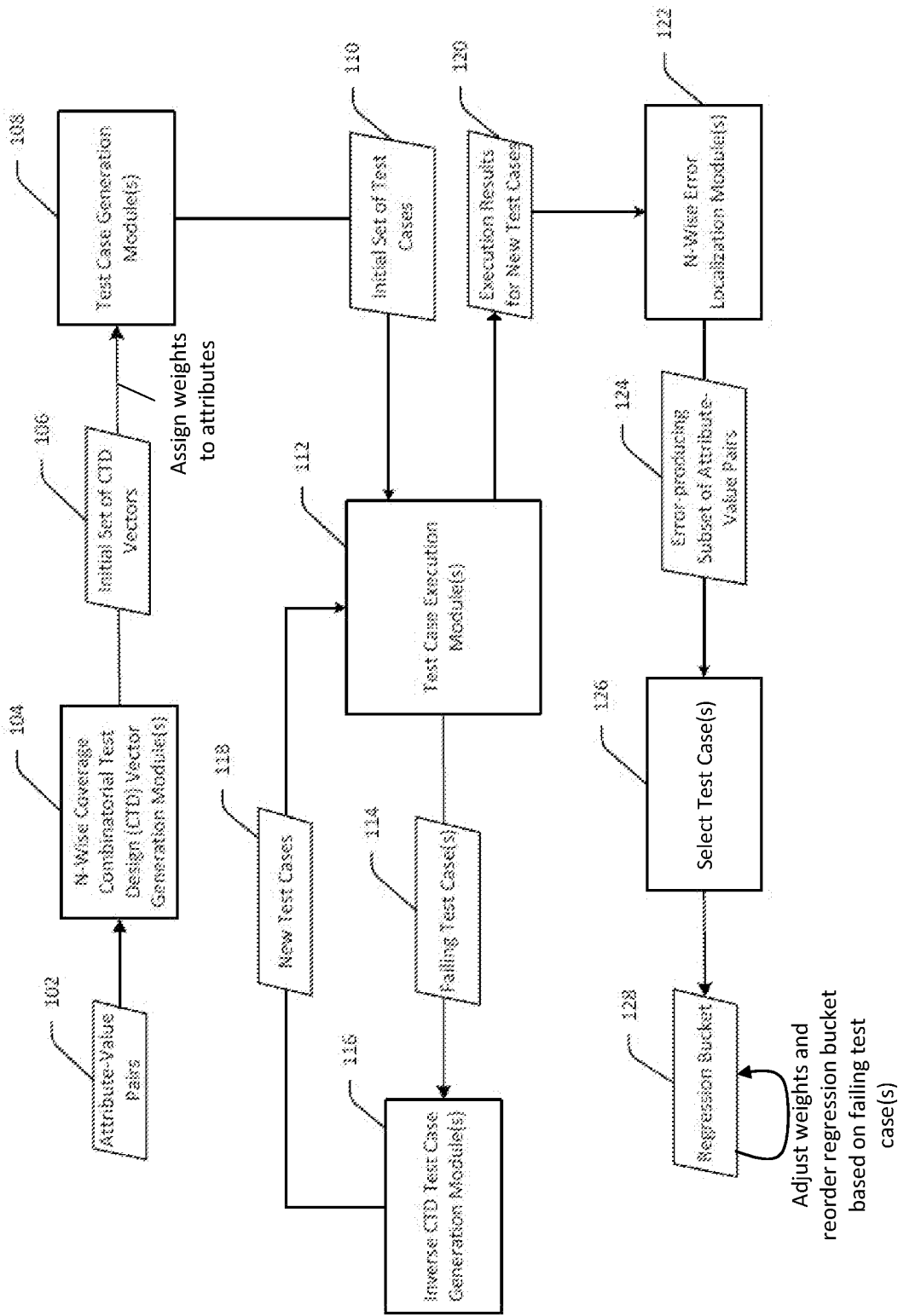
FIG. 2 is schematic hybrid data flow/block diagram illustrating fault detection and localization using Combinatorial Test Design (CTD) techniques and generation of a regression bucket of failing test cases that expose a detected fault in accordance with one or more example embodiments of the invention.

FIG. 2 is a schematic hybrid data flow/block diagram illustrating fault detection and localization using CTD techniques and generation of a regression bucket of failing test cases that expose a detected fault in accordance with one or more example embodiments of the present invention. Inputs to a SUT are modeled as a collection of attribute value pairs 102. Any number of attributes may be used to model SUT inputs and each attribute may take on any number of candidate attribute values. In example embodiments of the present invention, computer-executable instructions of one or more n-wise coverage CTD vector generation modules 104 are executed to generate an initial set of CTD vectors 106 that provides n-wise coverage of an entire Cartesian product space associated with the collection of attribute-value pairs 102.

Figure 3:
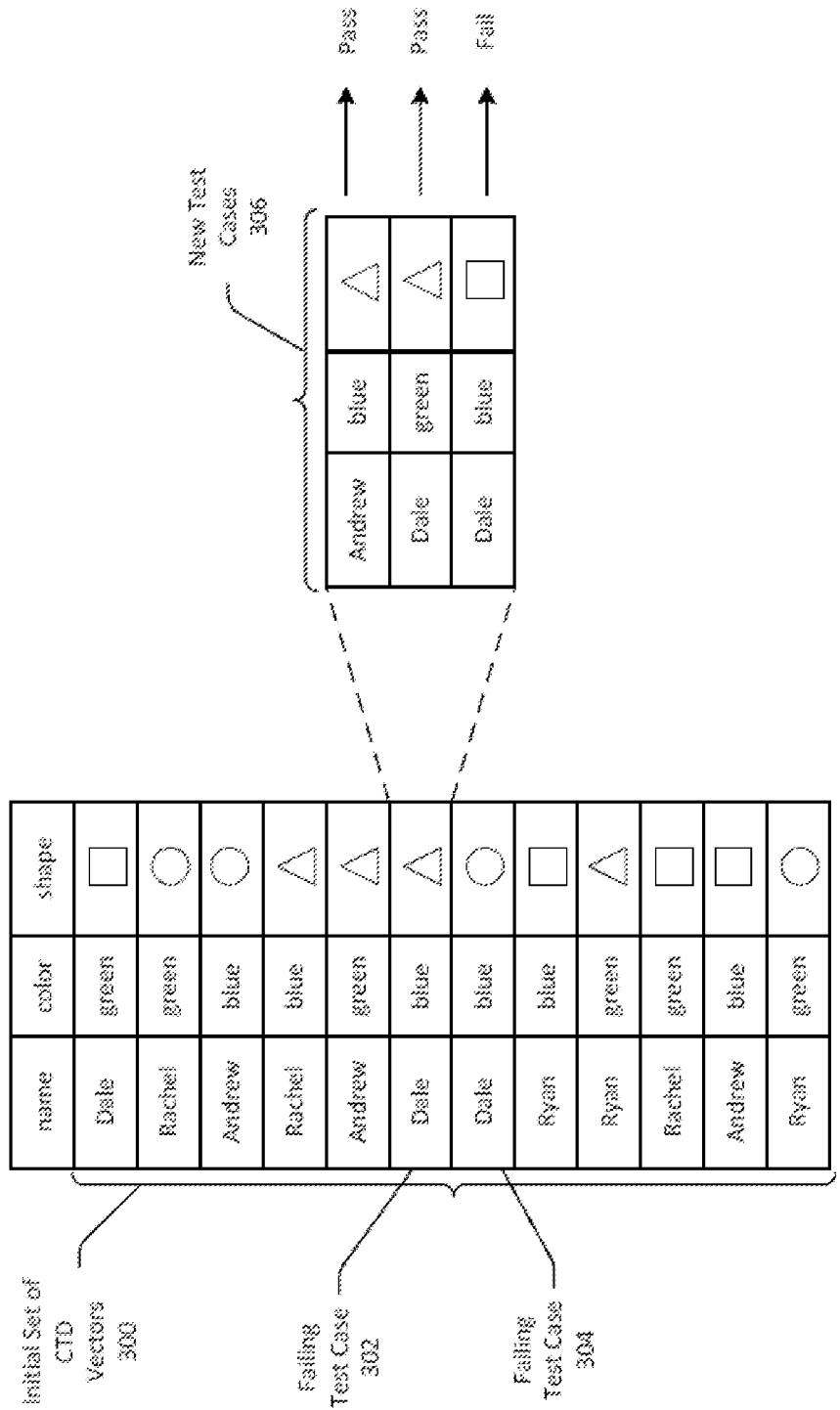
FIG. 3 is a schematic depiction of the selection of similar test cases from the regression bucket based on a selected failing test case using inverse combinatorics in accordance with one or more example embodiments of the invention.

In one or more examples, the entire Cartesian product space that contains all possible combinations of the attribute-value pairs 102 is reduced to a smaller set of CTD test vectors 106 that provides complete n-wise coverage of the entire test space. In example embodiments of the present invention, the complete n-wise coverage provided by the set of CTD vectors 106 may be complete pairwise coverage. For instance, if it is assumed that three attributes are modeled, namely, a "name" attribute, a "color" attribute, and a "shape" attribute as shown in FIG. 3, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs. In example embodiments, these 24 different combinations of attribute-value pairs are reduced down to a smaller set of combinations (i.e., the set of CTD vectors 106) that still provides complete n-wise coverage of the Cartesian product space. For instance, if complete pairwise coverage is sought, then the 24 different combinations can be reduced down to 12 distinct combinations that together include every possible pairwise interaction of attribute values. An example set of CTD vectors 300 is shown in FIG. 3. The example set of CTD vectors 300 includes all pairwise interactions between the attribute values of the attributes "name," "color," and "shape."

In example embodiments, a binary decision diagram or the like may be used to perform the reduction and identify the reduced set of CTD vectors 106 that provides complete n-wise coverage. While each CTD vector in the set of CTD vectors 106 includes a unique combination of attribute values, the set of CTD vectors 106 itself may not be unique. That is, there may be multiple different sets of CTD vectors, each of which provides complete n-wise coverage. For instance, while FIG. 3 depicts an example set of CTD vectors 300 for the example attributes and attribute values described, it should be appreciated that alternative sets of CTD vectors that include different combinations of attribute values may also independently provide complete n-wise coverage. It should further be appreciated that while the example set of CTD vectors 300 provides complete pairwise coverage and partial three-wise coverage, a greater number of CTD vectors would be needed to provide complete three-wise coverage. Stated more generally, as n increases, the number of CTD vectors needed to provide complete n-wise coverage increases logarithmically with n.

Figure 4:
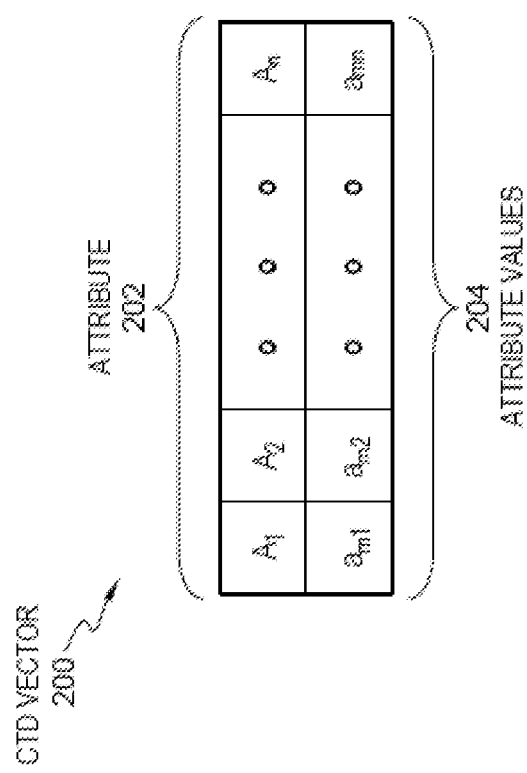
FIG. 4 is a schematic diagram of an example CTD vector in accordance with one or more example embodiments of the invention.

FIG. 4 depicts an example generic CTD vector 200 of the type that may be included in the set of CTD vectors 106 according to one or more embodiments of the present invention. The example CTD vector 200 includes a plurality of attributes 202. As previously described, the attributes 202 may be used to model inputs to the SUT 11. The attributes 202 may be associated with attribute values 204. In particular, each attribute 202 may have a corresponding attribute value 204, which may be one of one or more candidate attribute values that the attribute is allowed to take on.

Referring again to FIG. 1, in example embodiments of the present invention, computer-executable instructions of one or more test case generation modules 108 may be executed to generate, from the initial set of CTD test vectors 106, a corresponding set of test cases 110, which are then executed by the test case execution module(s) 112 to yield an execution result (pass or fail) for each test case. For instance, the set of CTD test vectors 106 may be provided as input to a test case generation tool configured to generate a respective corresponding test case for each CTD vector. Each test case in the set of test cases 110 may be designed to test the interactions among the particular combination of attribute values contained in a corresponding CTD vector of the set of CTD vectors 106. It should be appreciated that a set of CTD vectors and their corresponding test cases may, at times herein, be described and/or depicted interchangeably. For instance, the example set of CTD vectors 300 depicted in FIG. 3 may be interchangeably thought of as the corresponding set of test cases that test the particular combinations of attribute values represented by the set of CTD vectors 300.

In example embodiments of the present invention, computer-executable instructions of the test case execution module(s) 112 are executed to determine whether any test cases in the set of test cases 110 failed. In example embodiments of the present invention, execution of each test case 110 results in either a successful execution result, indicating that the combination of attribute values contained in the corresponding CTD vector 106 does not contain an n-wise (or m-wise where m<n) error, or a failure execution result, indicating that the combination of attribute values in the corresponding CTD vector 106 does contain an n-wise (or m-wise where m<n) error. If none of the test cases fail, i.e., all test cases execute successfully, the testing system 12 concludes that the SUT 11 has no defects that are detected by the existing test cases. Because the initial set of CTD vectors 106 (based on which the set of test cases 13 were generated) provided complete n-wise coverage, it can be ensured that an n-wise or lesser order error is not present. However, successful execution of all of the test cases in the initial set of test cases 110 does not ensure that a higher order error (k-wise where k>n) is not present.

On the other hand, in response to the execution of the set of test cases 13 resulting in one or more failing test case 114, in example embodiments, computer-executable instructions of one or more inverse CTD test case generation modules 116 are executed. The testing system 12, using inverse CTD, selects a particular failing test case 114 and produces a new set of test cases that is used to detect and localize the combination of attribute values that are causing the n-wise or lesser order error.

In addition, the testing system 12 identifies similar test cases 130 to the failing test case 114 within the regression bucket 128. Referring again to the example depicted in FIG. 3, assuming that failing test case 302 is selected as the failing test case 114, the example set of similar test cases 306 may be selected (as similar test cases 130) from the regression bucket 128. In example embodiments of the present invention, each example similar test case 306 may be found by changing the attribute value of a corresponding attribute in the selected failing test case 302 to a different value that is present in any other test case in the regression bucket 128.

For instance, a first similar test case corresponding to the CTD vector <Andrew, blue, triangle> is found by changing the attribute value of the "name" attribute in the failing test case 302 from "Dale" to "Andrew" while keeping the attribute values for the other attributes the same as in the failing test case 302. Likewise, a second similar test case corresponding to the CTD vector <Dale, green, triangle> is found by changing the attribute value of the "color" attribute in the failing test case 302 from "Blue" to "Green" while keeping the attribute values for the other attributes the same as in the failing test case 302. Lastly, a third similar test case corresponding to the CTD vector <Dale, blue, square> is found in the regression bucket 128 by changing the attribute value of the "shape" attribute in the failing test case 302 from "triangle" to "square" while keeping the attribute values for the other attributes the same as in the failing test case 302.

It should be appreciated that the respective attribute value that is changed to find each similar test case 306 is not present in the selected failing test case 114 (test case 302 in above example). Moreover, each changed attribute value is not present in any other failing test case as well (e.g., test case 304).

In other words, in example embodiments of the present invention, application of inverse combinatorics to the selected failing test case 114 includes finding similar test cases 130 with respect to each attribute of the failing test case 114. Once a failure producing subset of attribute values 124 is identified, the remaining cases in the regression bucket 128 are scanned to identify similar combinations of attribute values. Such identified similar test cases are likely to fail for similar reason (i.e. same defect) as the failing test case 114 itself.

Alternatively or in addition, the similar test cases 130 are identified using an integrated computational framework that supports natural language processing (instead of using inverse CTD). Here, the testing system 12 uses a natural language processing system (e.g., information extraction, NLG, text summarization, etc.), wherein the natural processing system processes the test cases in the regression bucket 128 to identify similar attribute structures and to output semantic labeled data. The labeled data can be in any suitable format that enables machine understanding of the natural language text input for the given application. The input text data to the natural processing system may include the failing test case 114 and the regression bucket 128, for example. The failing test case 114 can be selected and input by the user, in one or more examples.

Figure 5:
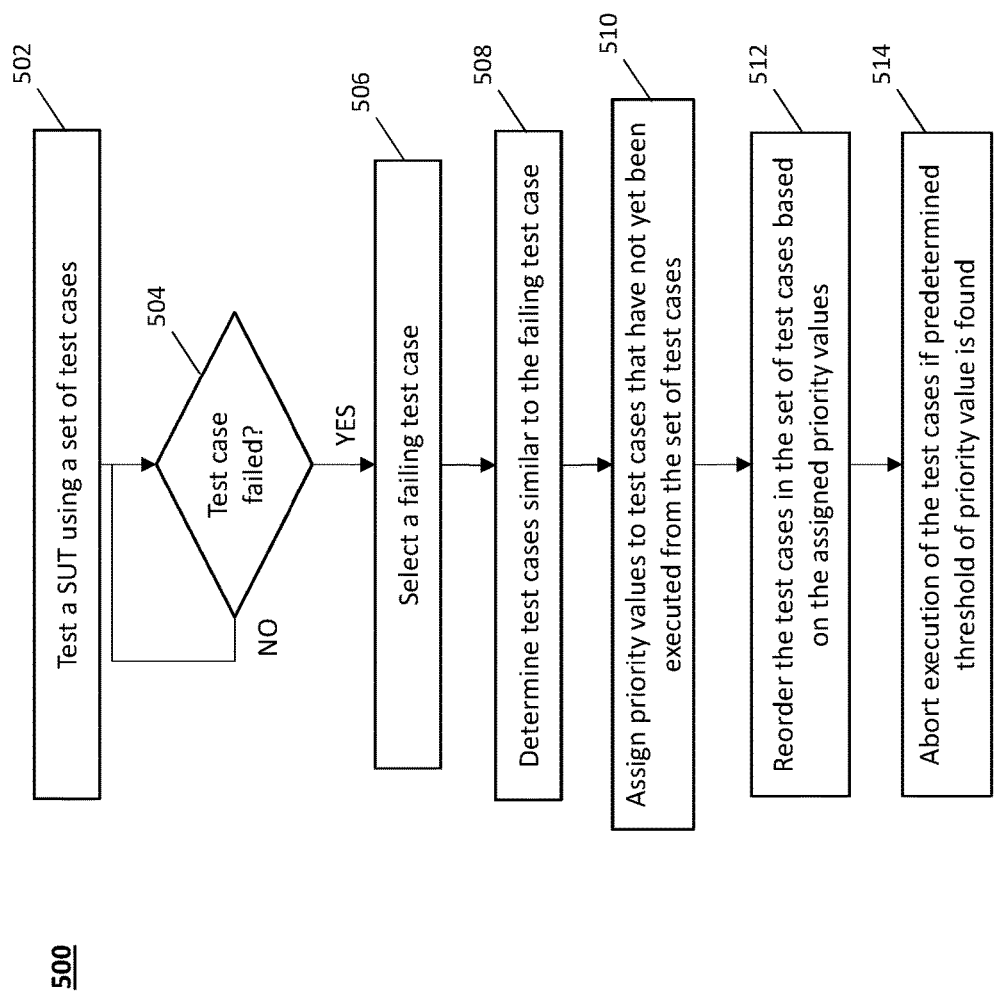
FIG. 5 is a process flow diagram of an illustrative method for fault detection using test case selection and prioritization in accordance with one or more example embodiments of the invention.

FIG. 5 depicts a flowchart of a method 500 for real time fault localization using CTD and test case priority selection according to one or more embodiments of the present invention. The method 500 includes testing, by the testing system 11, the SUT 12 by executing a set of test cases 110, at block 502. The test cases can be generated using CTD in one or more examples. The testing system 12 generates the set of test cases 110, such as regression tests, to run on the SUT 11. The testing system 12 further executes the set of test cases 110 and monitors the results on the SUT 11, at block 502. In one or more embodiments of the present invention, the testing system 12 may retrieve the test cases from one or more data stores.

In one or more embodiments of the present invention, the tests may be generated based on a functional coverage model of the SUT 11. The functional coverage model defines a triplet: functional attributes, a domain for each functional attribute, and a set of restrictions. The functional attributes may be any attribute of the SUT 11. The domains may define for each attribute a set of possible values. The cross-product of the different combinations of the attributes defines a functional coverage test-space. The test-space comprises a set of coverage tasks, each representing functional requirements to be tested: one requirement per functional attribute and the requirement is that the functional attribute will exhibit the behavior of the value of the coverage task. The coverage task may be seen as a tuple of one value per attribute. In a functional coverage model in which there are three functional attributes, one having three possible values, the second having two possible values, and the third having ten possible values, the cross-product test-space comprises sixty (60) coverage tasks. The functional coverage model defines possible combinations of values of the attributes as covered by the plurality of regression tests. It should be noted that in other embodiments of the present invention, the tests for the SUT 11 are generated for other types of coverage, such as lines-of-code coverage, and the like.

The test cases are continuously executed (sequentially or in parallel) until a failure is detected, at block 504. In one or more embodiments of the present invention, the execution monitor 118 may perform source code analysis to identify, for example, a fault source code path executed by a corresponding regression test that resulted in the error. The sequence in which statements are performed often depends on particular values associated with particular variables. As part of this analysis, the testing system 12 may determine under what specific circumstances program control flows through the fault code path. In one or more embodiments of the present invention, the testing system 12 may determine the last decision branch that was taken to drive the fault code path. When a test case fails, the method 500 selects the failing test case 114, at blocks 504 and 506.

The method 500 further includes determining, from the set of test cases 110, a set of similar test cases 130, at block 508. The similar test cases 130 are determined using inverse CTD or using natural language processing as described herein. The similar test cases 130 test the same attribute-value pairs as the failing test case 114 in one or more examples. Alternatively, or in addition, the similar test cases 130 execute the same operation path (e.g., code path) as the failing test case 114. In this manner, the similar test cases 130 are bound to fail for at least the same reason as the failing test case 114.

For example, consider that the failing test case 114 may cause a particular sequence of source code of the SUT 11 to be executed as part of the execution of the failing test case 114, and that the particular sequence of source code has a defect resulting in the failing test case 114 to be failing. Another test case (second test case), which may be intended to test another portion of the SUT 11, also requires the same particular sequence of source code of the SUT 11. In this case, even before the second test case tests the intended portion, the second test case may fail because of the defect in the particular sequence of source code. Alternatively, even if the sequence of source code executes after the intended portion, the second test case still reports a failure. The testing system 12, accordingly, determines such similar test cases 130 that exercise the same portion of the SUT 11 that is exercised by the failing test case 114.

Referring back to the flowchart of FIG. 5, the method 500 further includes assigning priority values to the test cases that have not yet been executed from the set of test cases 110, at block 510. In one or more examples, the priority values are assigned based on the inverse CTD. Alternatively, or in addition, priority values are assigned such that a predetermined highest priority value (e.g., 1) is assigned to a test case with attribute values closest matching with the combination of attribute values producing a failure of the selected failing test case 114. The closer the match of the attribute value pairs, the higher the priority value assigned to the test case.

In the case where the similar test cases 130 are determined using NLP, the closer the match between a test case and the failing test case 114, the higher the priority value that is assigned to the test case. The similarity between the test case and the failing test case 114 can be determined based on the attribute value pairs being used by the test cases in question. Alternatively, or in addition, the similarity can be determined based on the portions of the SUT 11 being exercised by the test cases. The higher the overlap between the portions of the SUT 11 being exercised by the test cases, the higher the similarity, and hence higher the priority value.

It should be noted that in one or more embodiments of the present invention, the priority values assigned to the test cases can be inversely proportional to the similarity between the test cases in a manner similar to the directly proportional assignment described herein.

Further, the method 500 includes reorganizing the set of test cases 110 to run the test cases in a different order based on the assigned priority values, at block 512. This new sequence of executions enables more efficient discovery of defects in the SUT 11 using the test cases. In one or more examples, the reordering moves the test cases with higher priority values (i.e., most similar to the failing test case 114) to the end of the sequence of the test cases in the set 110. In this manner, the test cases that exercise different portions of the SUT 11 are executed earlier. Further, the reorganizing of the test cases can include preventing execution of test cases with a priority value above (or below) a predetermined threshold, at block 514. For example, such test cases with at least the predetermined threshold of the priority values may not identify a different defect from those identified by the failing test case 114. By aborting or preventing execution of such test cases, the testing system 12 can save the time and resources required for such execution without loss of defect detection.

Accordingly, the method 500, includes initiating execution of the set of test cases 110. The set of test cases 110 are executed according to a first order of execution. During the execution, at runtime, the testing system 11 determines the failing test case 114 from the set of test cases. In one or more examples, a user selects the failing test case 114 for the testing system 11 to analyze. Once the failing test case 114 is selected, the testing system 11 identifies, from the set of test cases 110, a subset of test cases that are not yet executed. The testing system 11 further assigns a priority value to each test case from the subset of test cases that are not yet executed. The priority value is based on a similarity of a test case with the failing test case 114. The similarity is determined using one or more techniques described herein. The method 500 further includes reorganizing the set of test cases 110 to execute the subset of test cases in a second order of execution that is based on the priority values that are assigned, where the second order of execution is different from the earlier (first) order of execution. In one or more examples, the reorganization can further identify one or more test cases that are to be prevented from execution. The reordering can include ordering the test cases in an ascending order of similarity, where the test cases that are similar to the failing test case 114 are executed the last. Alternatively, the test cases are reordered in a descending order of similarity such that the similar test cases are executed first.

Illustrative methods in accordance with example embodiments of the invention and corresponding data structures (e.g., program modules) and components for performing the methods are described. It should be noted that each operation of the method 500 depicted in FIG. 5, may be performed by one or more components depicted in FIG. 1 or FIG. 6, whose operation are described in detail herein. In one or more embodiments of the present invention, program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 6:
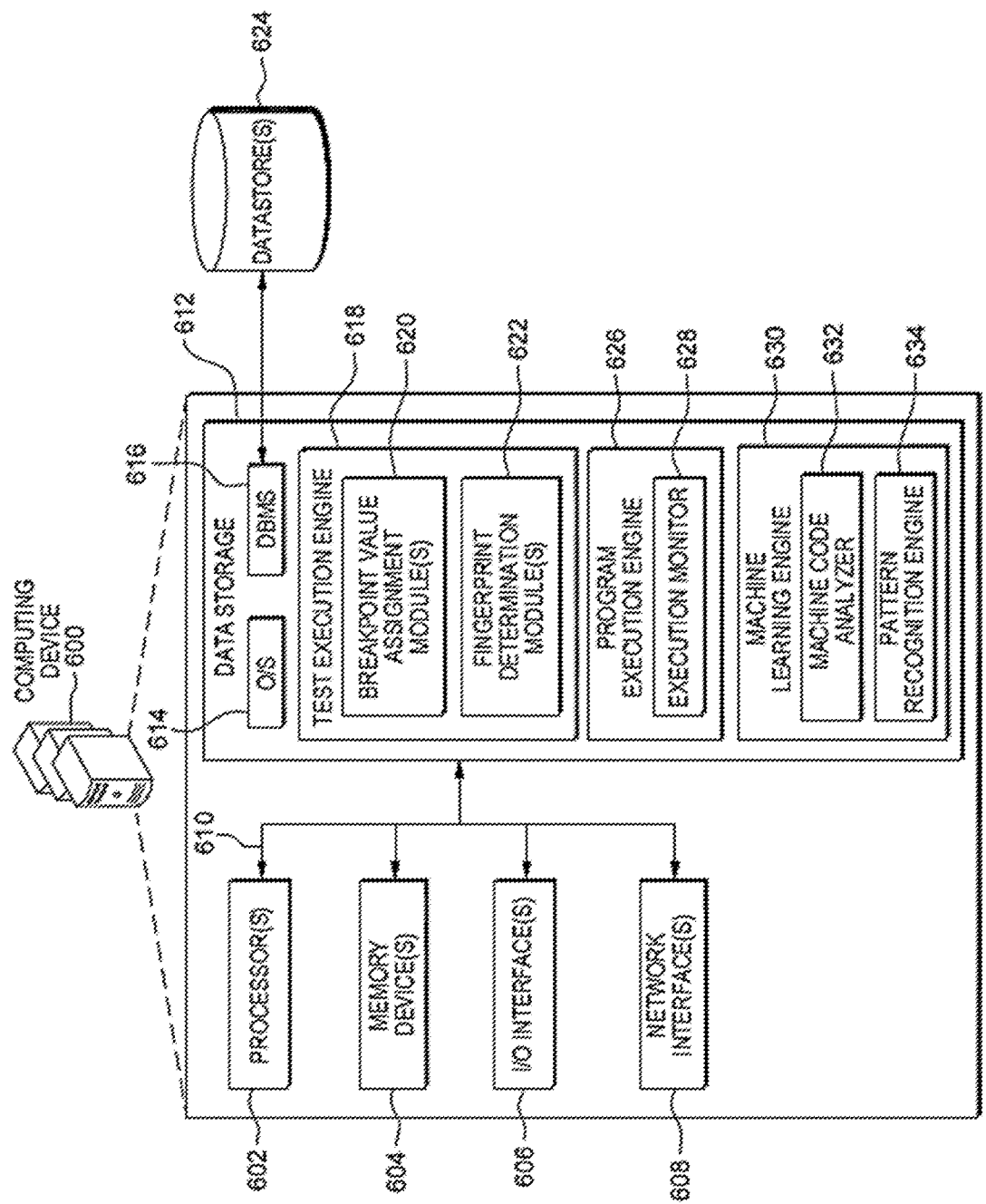
FIG. 6 is a schematic diagram of an illustrative computing device configured to implement one or more example embodiments of the invention.

FIG. 6 is a schematic diagram of an illustrative computing device 600 configured to implement one or more example embodiments of the invention. The illustrative computing device 600 may include a server or collection of servers; a personal computer; a handheld device; or the like. While the computing device 600 and/or any particular component of the computing device 600 may be described herein in the singular, it should be appreciated that multiple instances of the computing device 600 and/or any component thereof may be provided, and functionality described in connection with the computing device 600 may be distributed across multiple computing devices 600 and/or across multiple instances of any particular component of the computing device 600.

In an illustrative configuration, the computing device 600 may include one or more processors (processor(s)) 602, one or more memory devices 604 (generically referred to herein as memory 604), one or more input/output ("I/O") interfaces 606, one or more network interfaces 608, and data storage 612. The computing device 600 may further include one or more buses 610 that functionally couple various components of the computing device 600.

The bus(es) 610 may include at least one of a system bus, a memory bus, an address bus, or a message bus, and may permit the exchange of information (e.g., data (including computer-executable code), signaling, etc.) between various components of the computing device 600. The bus(es) 610 may include, without limitation, a memory bus or a memory controller, a peripheral bus, an accelerated graphics port, and so forth. The bus(es) 610 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 612 may include removable storage and/or non-removable storage including, but not limited to, magnetic storage, optical disk storage, and/or tape storage. The data storage 612 may provide non-volatile storage of computer-executable instructions and other data. The memory 604 and the data storage 612, removable and/or non-removable, are examples of computer-readable storage media (CRSM) as that term is used herein.

The data storage 612 may store computer-executable code, instructions, or the like that may be loadable into the memory 604 and executable by the processor(s) 602 to cause the processor(s) 602 to perform or initiate various operations. The data storage 612 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604 and may ultimately be copied to data storage 612 for non-volatile storage.

More specifically, the data storage 612 may store one or more operating systems (O/S) 614; one or more database management systems (DBMS) 616 configured to access the memory 604 and/or one or more external datastores 624; and one or more program modules, applications, engines, managers, computer-executable code, scripts, or the like such as, for example, a test execution engine 618 that may include one or more breakpoint value assignment modules 620 and one or more fingerprint determination modules 622, a program execution engine 626 that may include one or more execution monitor modules 628 and a machine learning engine 630 that may include one or more machine code analyze modules 632 and one or more pattern recognition engines 634. Any of the components depicted as being stored in data storage 612 may include any combination of software, firmware, and/or hardware. The software and/or firmware may include computer-executable instructions (e.g., computer-executable program code) that may be loaded into the memory 604 for execution by one or more of the processor(s) 602 to perform any of the operations described earlier in connection with correspondingly named modules/engines depicted in FIG. 1.

Although not depicted in FIG. 6, the data storage 612 may further store various types of data utilized by components of the computing device 600 (e.g., data stored in the datastore(s) 624). Any data stored in the data storage 612 may be loaded into the memory 604 for use by the processor(s) 602 in executing computer-executable instructions. In addition, any data stored in the data storage 612 may potentially be stored in the external datastore(s) 624 and may be accessed via the DBMS 616 and loaded in the memory 604 for use by the processor(s) 602 in executing computer-executable instructions.

The processor(s) 602 may be configured to access the memory 604 and execute computer-executable instructions loaded therein. For example, the processor(s) 602 may be configured to execute computer-executable instructions of the various program modules, applications, engines, managers, or the like of the computing device 600 to cause or facilitate various operations to be performed in accordance with one or more embodiments of the invention. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to other illustrative components depicted as being stored in the data storage 612, the O/S 614 may be loaded from the data storage 612 into the memory 604 and may provide an interface between other application software executing on the computing device 600 and hardware resources of the computing device 600. More specifically, the O/S 614 may include a set of computer-executable instructions for managing hardware resources of the computing device 600 and for providing common services to other application programs. In certain example embodiments, the O/S 614 may include or otherwise control the execution of one or more of the program modules, engines, managers, or the like depicted as being stored in the data storage 612. The O/S 614 may include any operating system now known or which may be developed in the future including, but not limited to, any server operating system, any mainframe operating system, or any other proprietary or non-proprietary operating system.

The DBMS 616 may be loaded into the memory 604 and may support functionality for accessing, retrieving, storing, and/or manipulating data stored in the memory 604, data stored in the data storage 612, and/or data stored in external datastore(s) 624. The DBMS 616 may use any of a variety of database models (e.g., relational model, object model, etc.) and may support any of a variety of query languages. The DBMS 616 may access data represented in one or more data schemas and stored in any suitable data repository. Data stored in the datastore(s) 624 may include, for example, breakpoint values; fingerprints; source code; regression tests; fault code paths; and so forth, any portion of which may alternatively or additionally be stored in the data storage 612. External datastore(s) 624 that may be accessible by the computing device 600 via the DBMS 616 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 600 may further include one or more network interfaces 608 via which the computing device 600 may communicate with any of a variety of other systems, platforms, networks, devices, and so forth. The network interface(s) 608 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 6 as being stored in the data storage 612 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 600 and/or other computing devices may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the invention. More particularly, it should be appreciated that software, firmware, or hardware components depicted as forming part of the computing device 600 are merely illustrative and that some components may not be present or additional components may be provided in various embodiments. While various illustrative modules have been depicted and described as software modules stored in data storage 612, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 500 may be performed by one or more computing devices 600 having the illustrative configuration depicted in FIG. 6, or more specifically, by one or more program modules, engines, applications, or the like executable on such a device. It should be appreciated, however, that such operations may be implemented in connection with numerous other device configurations.

The operations described and depicted in the illustrative method of FIG. 5 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 5 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for testing a system under test, the method comprising:

executing, by a processor in the system under test, a set of test cases associated with the system under test, wherein the system under test is operatively connected to a testing system to receive the set of test cases, wherein the set of test cases is executed on the system under test according to a first order of execution, and during the execution on the system under test, at runtime:

in response to a first test case executed on the system under test failing:

identifying, from the set of test cases, a subset of test cases that are not yet executed on the system under test;

for each test case from the subset of test cases, determining a similarity of the each test case with the first test case, wherein the similarity between the first test case and the each test case from the subset of test cases that are not yet executed is determined based on a combination of attribute values assigned to a set of attributes tested by the first test case and the each test case;

assigning a priority value to the each test case based on the similarity;

reducing time of executing, on the system under test, the set of test cases by reorganizing the set of test cases to execute the subset of test cases in a second order of execution based on priority values that are assigned, wherein the reorganizing comprises:

excluding, at runtime on the system under test, a test case from the subset of test cases based on the priority value of the test case exceeding a predetermined threshold; and reordering, at runtime on the system under test, the subset of test cases as inputs based on priority values that are assigned, wherein test cases having a higher priority are reordered ahead of test cases having a lower priority; and detecting and localizing a defect in the system under test by executing, via the processor on the system under test, the subset of test cases as the inputs according to the second order of execution, wherein the testing system causes the subset of test cases to be the inputs to the system under test such that the testing system causes the defect to be detected in the system under test, wherein the system under test comprises hardware having the defect, wherein, in response to the defect being localized and repaired, further testing of the hardware with the subset of test cases as the inputs produces a successful execution result, wherein reordering of the subset of test cases saves time and computing resources while resulting in the detecting and localizing of the defect.

2. The method of claim 1, wherein the set of test cases is determined using combinatorics test design for the system under test.

3. The method of claim 1, wherein the combination of attribute values that is used by the first test case and the first test case is identified using inverse combinatorics test design.

4. The method of claim 1, wherein the similarity between the first test case and the each test case from the subset of test cases that are not yet executed is determined based on a common code path.

5. The method of claim 1, wherein the similarity between the first test case and the each test case from the subset of test cases that are not yet executed is determined based on a common portion of the system under test that is exercised by both the first test case and the first test case.

6. The method of claim 1, wherein reorganizing the subset of test cases further comprises preventing execution of one or more test cases from the subset of test cases.

7. A system for machine code analysis, the system comprising:

at least one processor in a system under test; and at least one memory storing computer-executable instructions, wherein the at least one processor is configured to access the at least one memory and is configured to perform a method comprising:

executing, by the at least one processor in the system under test, a set of test cases associated with the system under test, wherein the system under test is operatively connected to a testing system to receive the set of test cases, wherein the set of test cases is executed on the system under test according to a first order of execution, and during the execution on the system under test, at runtime:

in response to a first test case executed on the system under test failing:

identifying, from the set of test cases, a subset of test cases that are not yet executed on the system under test;

for each test case from the subset of test cases, determining a similarity of the each test case with the first test case, wherein the similarity between the first test case and the each test case from the subset of test cases that are not yet executed is determined based on a combination of attribute values used by the first test case and the each test case;

assigning a priority value to the each test case based on the similarity;

reducing time of executing, on the system under test, the set of test cases by reorganizing the set of test cases to execute the subset of test cases in a second order of execution based on priority values that are assigned, wherein the reorganizing comprises:

excluding, at runtime on the system under test, a test case from the subset of test cases based on the priority value of the test case exceeding a predetermined threshold; and reordering, at runtime on the system under test, the subset of test cases as inputs based on priority values that are assigned, wherein test cases having a higher priority are reordered ahead of test cases having a lower priority; and detecting and localizing a defect in the system under test by executing, via the at least one processor on the system under test, the subset of test cases as the inputs according to the second order of execution, wherein the testing system causes the subset of test cases to be the inputs to the system under test such that the testing system causes the defect to be detected in the system under test, wherein the system under test comprises hardware having the defect, wherein, in response to the defect being localized and repaired, further testing of the hardware with the subset of test cases as the inputs produces a successful execution result, wherein reordering of the subset of test cases saves time and computing resources while resulting in the detecting and localizing of the defect.

8. The system of claim 7, wherein the set of test cases is determined using combinatorics test design for the system under test.

9. The system of claim 7, wherein the combination of attribute values that is used by the first test case and the first test case is identified using inverse combinatorics test design.

10. The system of claim 7, wherein the similarity between the first test case and the each test case from the subset of test cases that are not yet executed is determined based on a common code path.

11. The system of claim 7, wherein the similarity between the first test case and the each test case from the subset of test cases that are not yet executed is determined based on a common portion of the system under test that is exercised by both the first test case and the first test case.

12. The system of claim 7, wherein reorganizing the subset of test cases further comprises preventing execution of one or more test cases from the subset of test cases.

13. A computer program product comprising a non-transitory computer-readable storage medium readable by one or more processing circuits, the non-transitory computer-readable storage medium storing instructions executable by the one or more processing circuits to cause a method to be performed, the method comprising:

executing, by the one or more processing circuits in a system under test, a set of test cases associated with the system under test, wherein the system under test is operatively connected to a testing system to receive the set of test cases, wherein the set of test cases is executed on the system under test according to a first order of execution, and during the execution on the system under test, at runtime:

in response to a first test case executed on the system under test failing:

identifying, from the set of test cases, a subset of test cases that are not yet executed on the system under test;

for each test case from the subset of test cases, determining a similarity of the each test case with the first test case, wherein the similarity between the first test case and the each test case from the subset of test cases that are not yet executed is determined based on a combination of attribute values used by the first test case and the each test case;

assigning a priority value to the each test case based on the similarity;

reducing time of executing, on the system under test, the set of test cases by reorganizing the set of test cases to execute the subset of test cases in a second order of execution based on priority values that are assigned, wherein the reorganizing comprises:

excluding, at runtime on the system under test, a test case from the subset of test cases based on the priority value of the test case exceeding a predetermined threshold; and reordering, at runtime on the system under test, the subset of test cases as inputs based on priority values that are assigned, wherein test cases having a higher priority are reordered ahead of test cases having a lower priority;

detecting and localizing a defect in the system under test by executing, via the one or more processing circuits on the system under test, the subset of test cases as the inputs according to the second order of execution, wherein the testing system causes the subset of test cases to be the inputs to the system under test such that the testing system causes the defect to be detected in the system under test, wherein the system under test comprises hardware having the defect, wherein, in response to the defect being localized and repaired, further testing of the hardware with the subset of test cases as the inputs produces a successful execution result, wherein reordering of the subset of test cases saves time and computing resources while resulting in the detecting and localizing of the defect.

14. The computer program product of claim 13, wherein the set of test cases is determined using combinatorics test design for the system under test.

15. The computer program product of claim 13, wherein the similarity between the first test case and the each test case from the subset of test cases that are not yet executed is determined based on a common code path.

16. The computer program product of claim 13, wherein the similarity between the first test case and the each test case from the subset of test cases that are not yet executed is determined based on a common portion of the system under test that is exercised by both the first test case and the first test case.

17. The computer program product of claim 13, wherein reorganizing the subset of test cases further comprises preventing execution of one or more test cases from the subset of test cases.

\* \* \* \* \*